(12) United States Patent
Haustein et al.

(10) Patent No.: US 7,975,171 B2
(45) Date of Patent: Jul. 5, 2011

(54) AUTOMATED FILE RECOVERY BASED ON SUBSYSTEM ERROR DETECTION RESULTS

(75) Inventors: Nils Haustein, Soergenloch (DE); Ulf Troopens, Mainz (DE); Rainer Wolafka, Bad Soden (DE)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 12/204,475

(22) Filed: Sep. 4, 2008

(65) Prior Publication Data
US 2009/0070539 A1    Mar. 12, 2009

(30) Foreign Application Priority Data
Sep. 12, 2007  (EP) .................................. 07116171

(51) Int. Cl.
*G06F 11/00* (2006.01)

(52) U.S. Cl. .................................. 714/8; 5/6; 5/42; 5/47
(58) Field of Classification Search .................. 714/8
See application file for complete search history.

(56) References Cited

U.S. PATENT DOCUMENTS

| | | | | |
|---|---|---|---|---|
| 2002/0162075 A1* | 10/2002 | Talagala et al. | | 714/819 |
| 2003/0070109 A1* | 4/2003 | Harada | | 714/2 |
| 2003/0097608 A1* | 5/2003 | Rodeheffer et al. | | 714/7 |
| 2004/0073829 A1* | 4/2004 | Olarig | | 714/6 |
| 2005/0028048 A1* | 2/2005 | New et al. | | 714/54 |
| 2005/0066254 A1* | 3/2005 | Grainger et al. | | 714/764 |
| 2005/0160311 A1* | 7/2005 | Hartwell et al. | | 714/7 |
| 2005/0273646 A1* | 12/2005 | Hillier et al. | | 714/5 |
| 2005/0283655 A1* | 12/2005 | Ashmore | | 714/7 |
| 2006/0031722 A1* | 2/2006 | Kolvick et al. | | 714/52 |
| 2006/0075288 A1* | 4/2006 | Forrer et al. | | 714/6 |
| 2006/0075289 A1* | 4/2006 | Forrer et al. | | 714/6 |
| 2006/0212778 A1* | 9/2006 | Wheeler et al. | | 714/764 |
| 2007/0050664 A1* | 3/2007 | Tan et al. | | 714/5 |
| 2007/0050667 A1* | 3/2007 | Zohar et al. | | 714/6 |
| 2007/0067669 A1* | 3/2007 | Morris et al. | | 714/6 |
| 2007/0094569 A1* | 4/2007 | Thayer et al. | | 714/763 |
| 2007/0168754 A1* | 7/2007 | Zohar et al. | | 714/42 |
| 2007/0220313 A1* | 9/2007 | Katsuragi et al. | | 714/6 |
| 2008/0010499 A1* | 1/2008 | Vingralek | | 714/6 |
| 2008/0115017 A1* | 5/2008 | Jacobson | | 714/710 |
| 2008/0189578 A1* | 8/2008 | Raghuraman et al. | | 714/47 |

* cited by examiner

Primary Examiner — Scott T Baderman
Assistant Examiner — Chae Ko
(74) Attorney, Agent, or Firm — Roy W. Truelson

(57) ABSTRACT

The present invention provides a method and system for performing file recovery in a computer system coupled to a storage subsystem, wherein a data scrubbing process analyzes said storage subsystem for potential or existing storage errors. The method includes: receiving a report from said data scrubbing process describing said errors, including logical block addresses (LBAs) of storage locations containing errors; interacting with a file system created on logical unit numbers (LUN) provided by said storage subsystem in order to identify file information pertaining to the erroneous LBAs; moving the file pertaining to said erroneous LBAs to a different storage location; updating pointers to said file; in case of an unrecoverable, accessing a backup copy of said file from a backup location; if a predetermined degree of error severity is exceeded, creating an additional copy of said file; and updating the pointers to said file managed by the file system, respectively.

10 Claims, 4 Drawing Sheets

AUTOMATED FILE RECOVERY BASED ON SUBSYSTEM ERROR DETECTION RESULTS

1. BACKGROUND OF THE INVENTION

1.1. Field of the Invention

The present invention relates to the field of electronic storage systems management.

1.2. Description and Disadvantages of Prior Art

Figure 1:
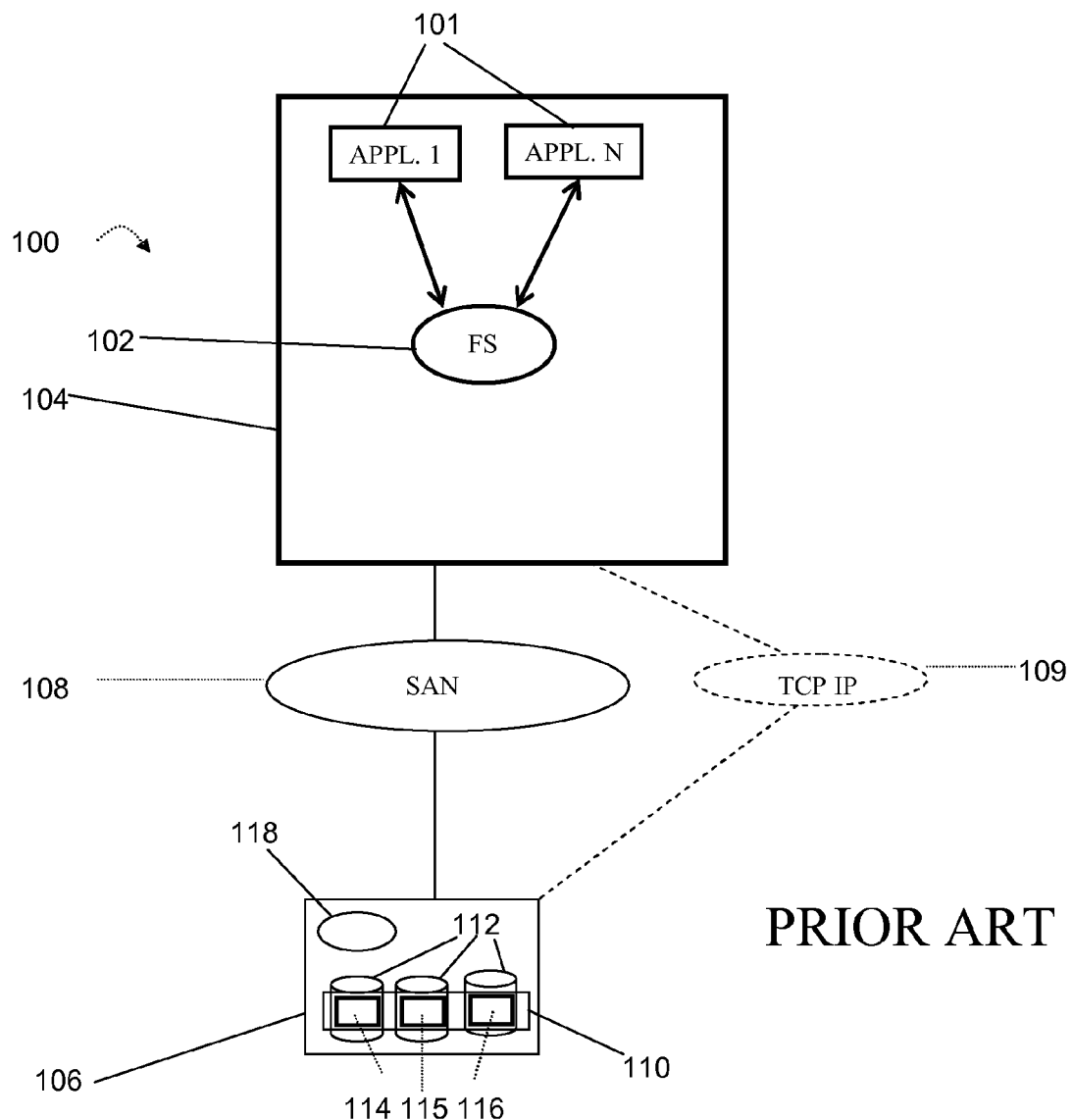

FIG. 1 illustrates the most basic structural components of a prior art hardware and software environment used for a prior art file recovery method, and describes a system 100 according to prior art.

Referring to FIG. 1, some applications 101, denoted as APPL_1, . . . APPL_N running on a host computer 104 typically store data in a file system 102. A host computer system 104 is connected to a storage system 106 via a storage network 108 such as a Storage Area Network (SAN). The host computer 104 is connected to the storage system 106 through an additional management network 109 which might be based on Ethernet and TCPIP. The applications 101 are business applications reading and writing files to a file system 102. Respective files 110 are stored in a storage system 106.

A file 110 is stored on a single disk or an array of disks (RAID) 112 pertaining to the storage system 106. The file thereby occupies one or more logical block addresses (LBA) 114, 115, 116 which may reside on one or multiple disks 112.

Storage subsystems 106 according to prior art incorporate methods and processes 118 to detect read errors prematurely i.e., before an application attempts to read that data. One of these methods is referred to as "data scrubbing" which expression is used throughout this disclosure representative also for similar processes of prior art which check for storage related errors. The "data scrubbing" process 118 periodically reads the data and checks for read errors.

The data scrubbing method is implemented in disk systems (such as IBM DS4000 and IBM DS8000) as a background process. This process is transparent to the applications and periodically reads data addressed by logical block addresses (LBA) within a storage system. The data might be stored on a single disk or on a RAID array (Redundant Array of Independent/Inexpensive Disks). The purpose of this process is to identify data addressed by logical blocks which is erroneous; i.e., which shows errors during the read process, and if possible perform corrective actions (such as copying records to a different portion of the storage media).

Data scrubbing implemented in storage systems works block oriented; i.e., the data stored in logical blocks is read in order to verify whether it is readable. Some implementations check the ECC (Error-correcting code) pertaining to the data block in order to verify the data is authentic and correct the data if required.

Prior art Data scrubbing implemented in storage systems identifies erroneous data. It typically implements certain error classes and recovery actions. For critical errors where the data is not readable without correction, the storage system automatically relocates the data to spare block addresses. Recovery mechanisms for bad blocks might include reading erroneous block multiple times and reconstructing unreadable blocks from redundant information which for instance is maintained in RAID levels such as RAID 1, RAID 3, RAID 5, RAID 6 and RAID 10. The original block address is thereby replaced by the spare block address used for relocation. Thus, subsequent operations to the original block address are referred to the spare block address. For non-critical errors the data scrubbing process within the storage system keeps a list of block addresses which may become bad.

Typically, a file system 102 reads and writes data to a disk subsystem. Thereby the data is usually arranged in files 110 which are written and read by applications 101. Each file uses one or more logical block addresses (LBA) 114, 115 and 116 on the storage system 106. Respective typical applications are file systems, volume managers and data bases.

One problem with the prior art described above is that for critical errors only the failing block is relocated to an error-free storage location. Thereby the data scrubbing process does not have knowledge which other logical blocks are associated with the failed block. Thus, there may be other logical blocks (LBAs) related to one and the same file which may become bad.

Another problem of prior art is that for non-critical errors the application or the file system does not get the information that data blocks may eventually become bad. For non-critical errors which the data scrubbing process detects, it may not even move the erroneous LBA to a new LBA but correct the problem otherwise; e.g., through other redundancy like RAID. Non-critical errors can also be of such nature that it is recoverable with no need to move an LBA.

In extreme cases the data scrubbing process might detect an error which is not recoverable and thus can not be relocated. This for example can happen when data from an LBA can not be read at all due to a hardware failure. According to prior art manual intervention is disadvantageously required to restore the file from a copy such as a backup on a backup medium or a replica of a file system.

2. SUMMARY AND ADVANTAGES OF THE INVENTION

The present invention provides a method and system which notify the application or file system about critical and non-critical errors. Furthermore, it is proposed to implement a method in the application to automatically move the file(s) related to the bad blocks to a new set of logical block addresses (LBAs), and if needed for unrecoverable errors, to proactively interact with other applications or file systems that are able to restore the data—such as backup or content management applications. According to its basic aspect a method and respective system is disclosed, for performing file recovery in a computer system which is operatively coupled with a storage subsystem, wherein a data scrubbing process analyzes the storage subsystem for potential or existing storage errors, which method is characterised by the steps of:

a) receiving a report from the data scrubbing process describing the errors, wherein the report includes logical block addresses (LBAs) of storage locations where the errors are located, b) interacting with a file system preferably created on logical unit numbers (LUN) provided by said storage subsystem in order to identify file information, e.g. file name, path, pertaining to the erroneous LBAs, c) automatically moving the file pertaining to the erroneous LBAs to a different storage location, d) updating the pointers to the file of the file system, e) in case of an error which is treated as "unrecoverable" by the data scrubbing procedure, providing a backup copy of the file from a backup at a predetermined storage location, f) if a predetermined degree of error severity exceeded then a file recovery module creates an additional copy of said file proactively, and g) updating the pointers to said file in the file system or application, respectively.

The advantage results that even errors which are unrecoverable by the data scrubbing process of the storage system can automatically recovered by the interaction of the storage system, the file recovery module, and the application. Thus, no human interaction is required.

The present invention teaches a system and method ready to cooperate with the prior art data scrubbing process—or any such prior art process which analyses the functionality of a storage subsystem and generate respective notifications— and application operating on a according storage subsystem wherein:

1. the data scrubbing process informs a file recovery module about erroneous data stored in LBA and its severity,
2. the file recovery module interacts with the application or the file system managing the data (such as a file system) in order to identify the file pertaining to the erroneous LBAs,
3. the file recovery module automatically moves the file pertaining to the erroneous blocks to another location and thereby updates all necessary pointers to the files; in one embodiment the file recovery module creates a secondary copy of the file based on the severity of the error;
4. if the read operation pertaining to the automatic move process fails, the file recovery module determines if there is a backup copy of the file available. The backup copy of the file can be kept either by the file recovery module or by an external prior art backup application such as IBM Tivoli Storage Manager (TSM) or IBM Continuous Data Protection (CDP). If this is the case the backup application retrieves the data from a backup medium and continues the move process.

Since a prior art data scrubbing mechanism is executed automatically in the background of a storage subsystem, non-recoverable errors can be detected and corrected on a data file- or object level proactively with this invention before the application or file system runs into that error condition where data files or -objects can not be accessed and a restore needs to be initiated manually. The file recovery module according to this invention relocates; i.e., moves a file containing an erroneous LBA to a new LBA to ensure that the file is readable in its entirety. If the file includes error correction or detection codes such as CRC or ECC this process ensures that the integrity of the file is guaranteed. If the file cannot be relocated the inventional method automatically initiates the retrieval of a copy (backup) of that file. For critical data files the inventional method creates additional copies if the critical file contains an erroneous LBA, to ensure that this critical data is always accessible. Creating additional data copies can be managed solely by the file recovery module or the file recovery module interacts with a backup server application.

Preferably, if the data scrubbing process detects an error at an LBA-level it determines the severity of the error. The severity according to this invention is either a) recoverable, b) critical, or c) non-recoverable. A recoverable error was an initial read error which as been recovered by the data scrubbing module. A critical error is similar to the recoverable error but the data scrubbing module 118 running on respective storage subsystem 106 had some difficulties to recover it. A non-recoverable error is a read error which has not been recovered, thus it is a permanent data access loss for the application. The severity and the associated LBA are posted by the data scrubbing module to the file recovery module according to this invention.

When further, an integration of this method steps is implemented with other I/O layers according to prior art, preferably via a standardized interface, then this allows to:

First, query a file name, or a data set name, or any data object name based on a logical block address (LBA);

Second, instruct an I/O layer to move the file or the data set, or the data object, and Third, move the file or the data set or the data object and notify the I/O layer about the new location of the file or dataset or data object, respectively.

Further, it should be noted that beyond the before-mentioned "business application" 101, also the before-mentioned file system 102 can be regarded as an application, as it is also of functional nature, and it represents just a continuation and physical refinement of the read or write commands originated from the business application.

Further, it should be noted that in the present disclosure the term "move" for a file, for example, is intended to denote an actual relocating of the respective data object either via a respective existing file system function or via a dedicated inventional functionality which copies the data object to a new location, deletes the former object and names the copied object with the name of the deleted one.

The skilled reader will understand from the total of the disclosure made herein, that a key feature of the present invention is a tight information flow and information exchange between the application, the inventional file recovery module and the storage subsystem, wherein from this information flow respective useful actions are obtained which help to provide an improved error detection and recovery.

3. BRIEF DESCRIPTION OF THE DRAWINGS

Figure 2:
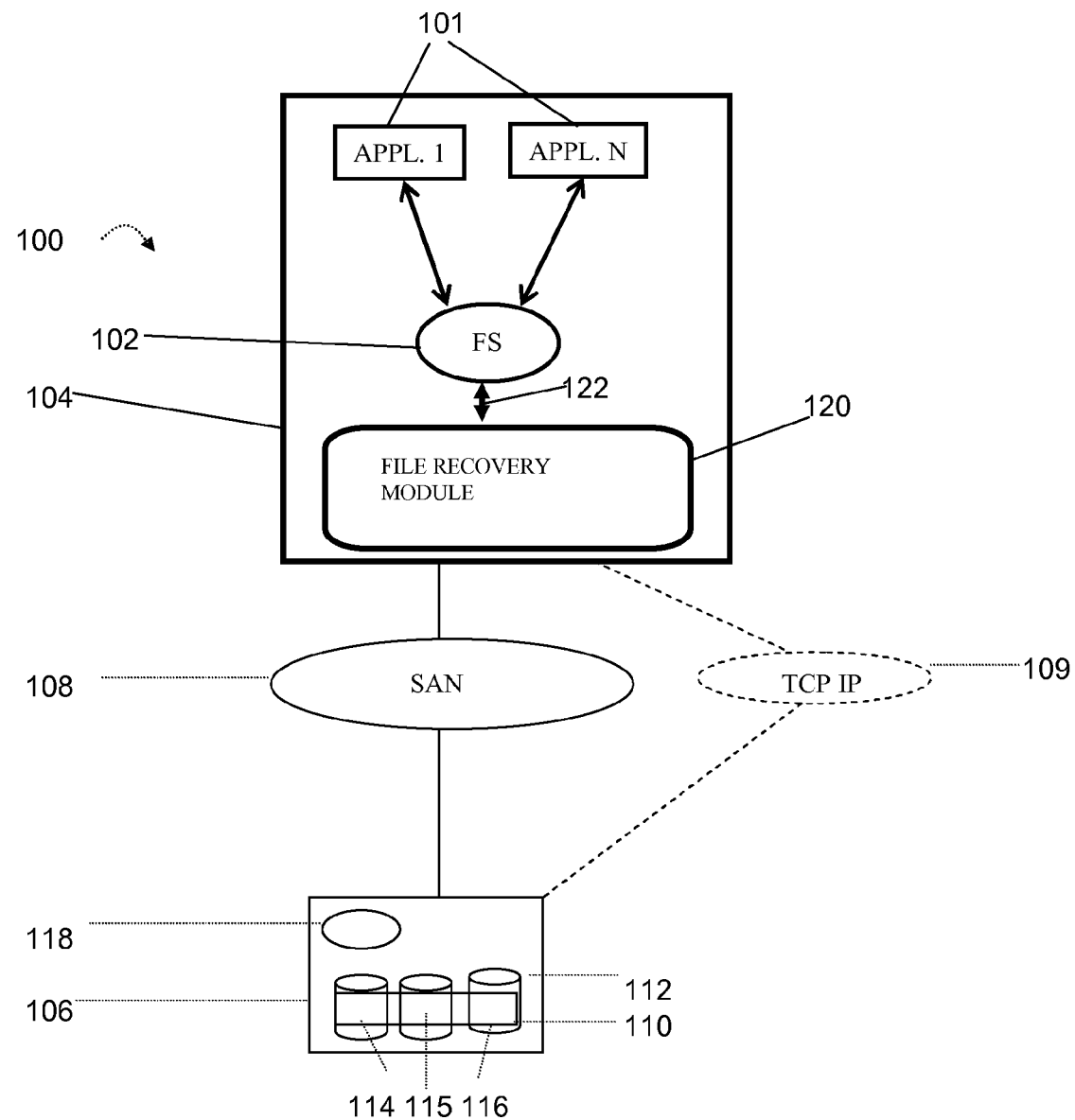
Figure 3:
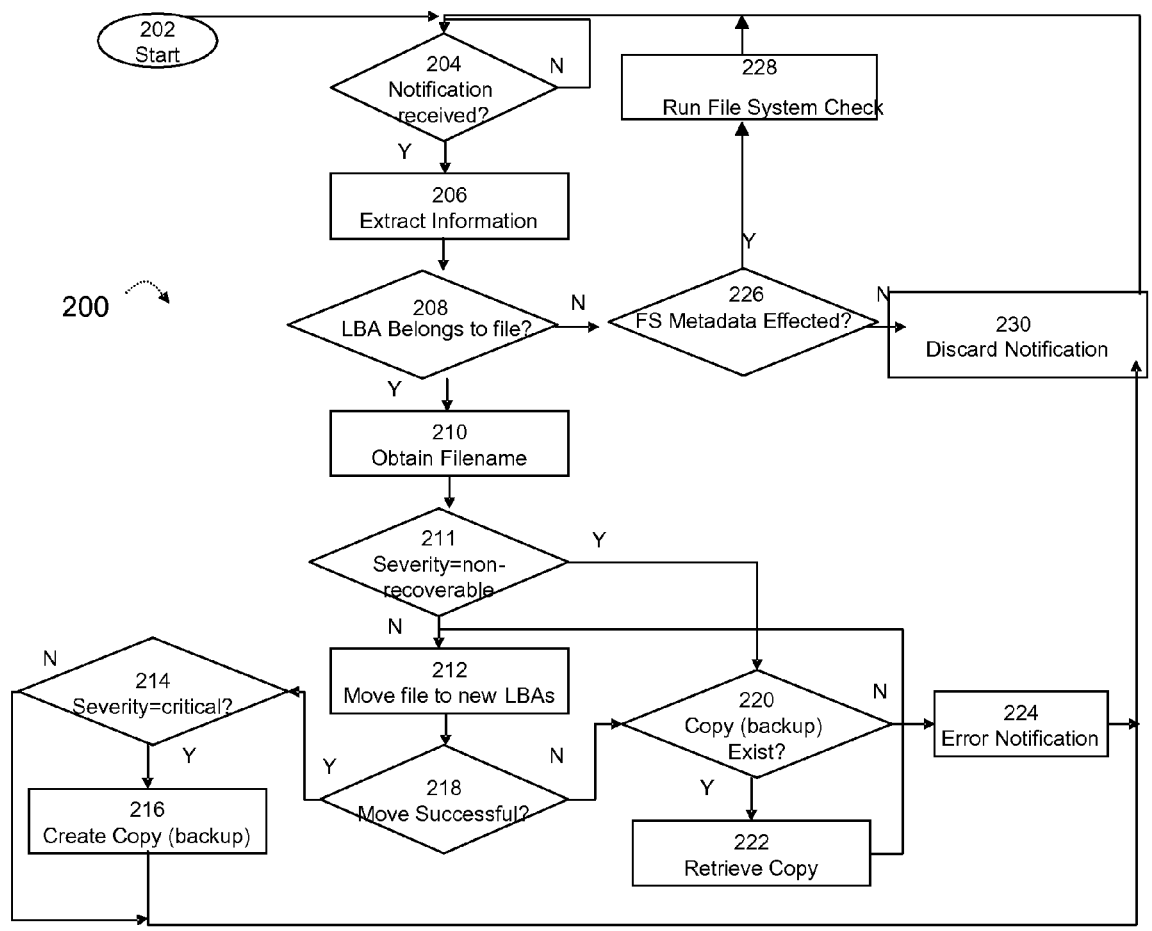
Figure 4:
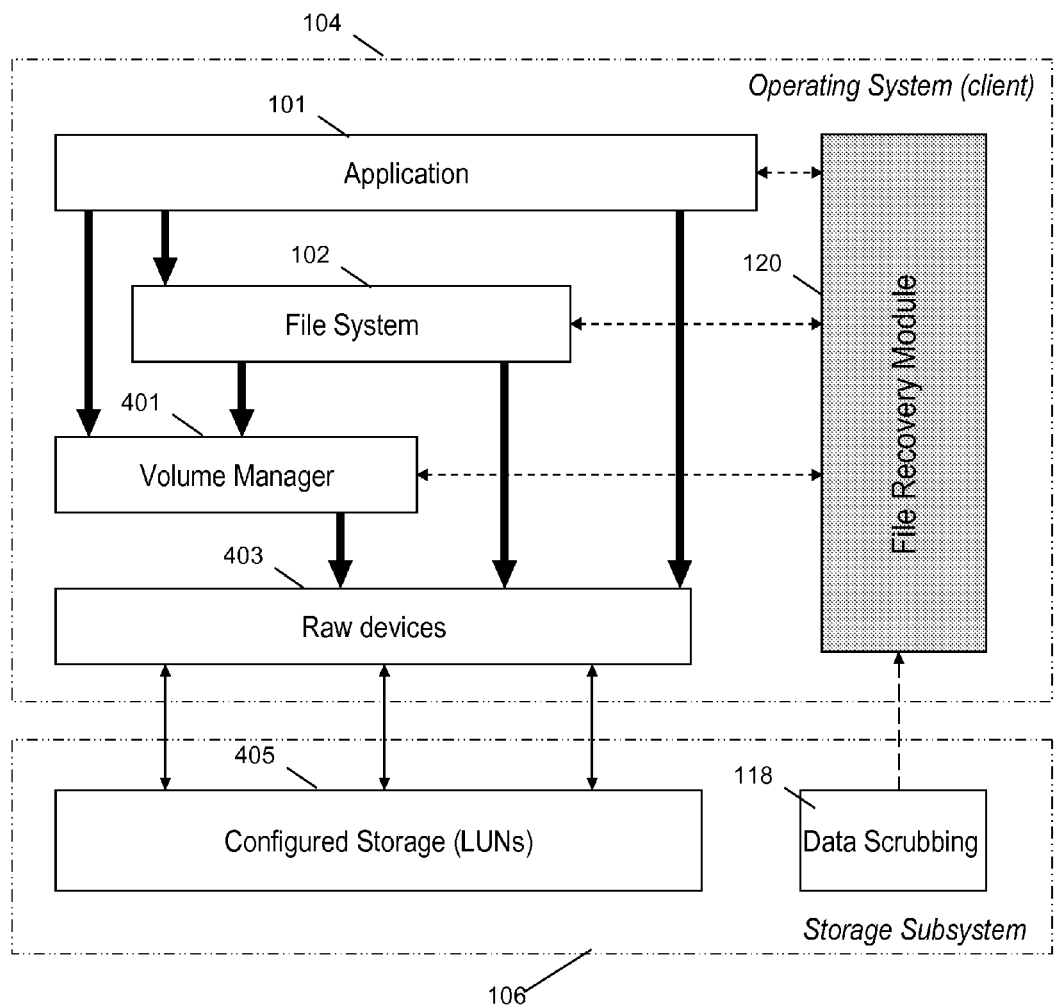

The present invention is illustrated by way of example and is not limited by the shape of the figures of the drawings in which:

FIG. 1 illustrates the most basic architectural components of a prior art hardware and software storage environment, FIG. 2 illustrates the most basic architectural components of an inventional hardware and software storage environment used for a preferred embodiment of the inventional method, FIG. 3 illustrates the control flow of the most important steps of a preferred embodiment of the inventional method, and FIG. 4 illustrates different I/O layers according to prior art storage environments which enable for further embodiments of inventional methods.

4. DETAILED DESCRIPTION

FIG. 2 describes a system according to prior art 100 incorporating the inventional system 120. A business application 101 running on a host computer 104 stores data in file system (FS) 102 which is created on a connected, block oriented storage system 106 via a storage network 108 such as a SAN. In this embodiment the host computer 104 is connected to the storage system 106 through an additional management network 109 which might be based on Ethernet and TCPIP. The application is the business application and reads and writes files 110 to the file system 102. Respective files 110 are stored in a storage system 106.

A file 110 is stored on a single disk or an array of disk (RAID) 112 pertaining to the storage system 106. The file thereby occupies one or more logical block addresses (LBA) 114, 115, 116 which may reside on one or multiple disks 112. The storage system 106 incorporates a data scrubbing process 118 which periodically reads the data and checks for read errors.

According to this inventional embodiment, the host computer 104 also includes a file recovery module 120 which is introduced by the present invention. The file recovery module 120 has a logical connection 122 to the file system 102 which enables it to identify file names based on LBA and also to initiate certain file oriented operations such as in particular move operations to relocate a file to different LBAs.

The data scrubbing process 118 periodically reads data stored in LBA 114-116. When the data scrubbing process detects an error it notifies the file recovery module 120. This notification is unsolicited and may not be in accordance to a read or write operation of the application 101 or file system 102. The notification can be sent in-band via the storage network 108 for instance via the SCSI Asynchronous Event Notification (AEN) or out-band via the management network 109, and it can be based on SNMP, SMI-S or any other protocol. The data scrubbing process includes the severity of the error and the associated LBA in the notification.

The file recovery module receives the notification from the data scrubbing process 118 and implements a method according to this invention to automatically move the associated file to a new set of LBAs. It thereby communicates with the file system 102 via the logical link 122.

The control flow of the process 200 implemented in the file recovery module is described with reference to FIG. 3 next below:

In FIG. 3, the process starts at step 202 and continues to step 204 where the file recovery module periodically checks if a notification from the data scrubbing process has been received. If the answer is NO, the process returns to step 204 indicating a repetitive process. Otherwise, if the answer is YES, the file recovery module extracts the severity and the affected LBA(s) from the notification in step 206. The process then flows to a checkpoint 208, where the file recovery module checks, whether the LBA pertains to a file of this file system. This may involve a communication to the file system 102 via the logical link 122 mentioned before. If the answer is NO, the process flows to step 226 explained below.

Otherwise if the answer is YES, the process continues to step 210 where the file recovery module identifies the file name. This may involve communication to the file system 102 via the logical link 122.

In step 211 the file recovery module checks the severity of the error to be non-recoverable. If the answer is YES ("Y"), the process flows to step 220 explained later. If the answer in step 211 is NO, "N", then the process flows to step 212.

In step 212 the file recovery module moves the file to a new set of LBA and thereby ensures that the file is readable or not. The file move operation may leverage standard methods provided by an operating system such as a copy or move command in UNIX. The process then flows to step 218, where the result of the move operations of the prior step 212 is checked. If the operation was successful, the process flows to step 214.

In step 214 the process checks the severity of the error to be critical. If this is true, the process flows to step 216 where an additional copy of the file is created. This additional copy can either be created by the file recovery module, or the file recovery module instructs an external, prior art backup application to create another backup copy of the file. The rational for this additional copy is to create more redundancy for files which have suffered read errors. If in step 214 the severity of the error is not critical, the process continues to step 230. If the result of step 218 is false because the move operation in step 212 failed, the process continues to step 220.

In step 220 the file recovery module checks if there is a backup copy of the file available. A backup copy of the file can either be kept by the file recovery module or by an external backup application or by the business application 101 or by the file system 102. This may involve communication to the file system 102 via the logical link 122 mentioned above. Typically file systems offer an application program interface (API) for such communication. If there is a copy of the file, the process flows to step 222 where the copy of the file is received.

From step 222 the process flows back to step 212 where the move operation is re-attempted using the backup copy of the file which was retrieved in step 222. If there is no copy of the file, the process flows to step 224 where an error notification including the erroneous file, LBA and severity is sent to the user. It has to be noticed that this error notification is preferably sent proactively; i.e., even before the user or application might have requested to read that data. From step 224 the process flows to step 230. In step 230 the notification from the data scrubbing process pertaining to storage system 106 received in step 204 is discarded by the file recovery module, and the process flows back to step 204 awaiting another error notification.

A file move operation typically reads the file of the original LBAs and writes it to a new set of LBAs. This process ensures that the entire file is readable. The meta information including the LBAs associated with the file is updated to reflect the new LBAs. This may involve communication to the file system 102 via the logical link 122. In an alternate embodiment the file recovery module may instruct the file system 102 in step 212 to move the file and in step 222 to copy the file.

In one embodiment a notification from the data scrubbing process 118 about a non-recoverable error instructs the file recovery module that the data can not be reconstructed by the subsystem. The recovery module automatically retrieves a copy of the file when available, according to steps 220 and 222. The copy of a file might be kept by the file recovery module itself or by an external prior art backup application. An external backup application thereby can be identical to application 101. If an external prior art backup application such as IBM Tivoli Storage Manager or IBM Continuous Data Protection is available and has a copy of the file to be recovered, the file recover module simply instructs that application to retrieve the file. The file recovery module moves the file to a new set of LBA. After restoring the data to the new LBAs, all meta data is updated to reflect the new location of the file in the subsystem.

In step 226, continuing from step 208, it is analyzed whether the unrecoverable LBA pertains to meta data of this file system (FS) such as an inode of a Unix file system or whether the LBA is currently assigned to but not used by the file system. This may involve a communication to the file system 102 via the logical link 122 mentioned before.

If the answer in step 226 evaluates to YES—indicating that the defective LBA contains meta data of the file system—, then the process flows to step 228 which tries to repair the file system meta data using prior art, for instance by calling the file system check utility (fsck) on a Unix system.

If the answer in step 226 evaluates to YES—indicating that the defective LBA contains neither a file nor meta data of the file system—, then the process flows to step 230.

Extended Embodiments

FIG. 4 presents the I/O layers of a storage environment according to prior art in the left portion of the drawing, whereas the inventional file recovery module 120 is depicted right. For a given storage solution not all layers may be involved but a subset of them should be involved. There are multiple layers involved for reading and writing data in a storage environment according to prior art. The inventional file recovery module 120 and associated programs implementing the inventional methods can be implemented with all these different layers.

In the sample implementation of FIG. 4, the data is stored in a Logical Unit Number (LUN) 405 denoting a storage device address pertaining to storage system 106. A storage system 106 may include a plurality of LUNs 405. The LUNs 405 being accessed are typically, but are not limited to, single disks, JBODs (Just a bunch of disks) or RAID arrays. The business application 101 can issue an I/O request (such as a request for reading or writing data) via a file system 102, a logical volume manager 401 or directly to prior art raw (storage) devices 403. Raw devices 403 are block oriented devices that allow accessing a storage device such as a hard drive directly, bypassing the operating system's caches and buffers. Raw device access is commonly used with database management systems.

In a further variant, the file system 102 and the storage subsystem 106 is implemented within the same server hardware.

Conceptionally, the file recovery module 120 according to this invention works with all above mentioned I/O topologies and, thus, the inventional method can be applied to all prior art I/O topologies.

The inventional file recovery module 120 can also work with applications (such as a database) using raw logical volumes provided by volume manager 401. The database application 101 keeps track of the location (block addresses) of the data sets. If the file recovery module 120 is informed by the data scrubbing process 118 about an erroneous LBA, it communications with the database application 101 to identify the datasets stored on subject erroneous LBA. Subsequently the file recovery module moves the datasets to another location, in order to enable a successful read process occurring potentially in the future. The actual move of the datasets may be executed by the database application 101, the file recovery module instructs the database application to do so.

The file recovery module 120 can also work with a logical volume manager (LVM) such as the native LVM of the operating system. The LVM keeps track of the location (block addresses) of the physical partition and the logical partitions. If the file recovery module is informed by the data scrubbing process about an erroneous LBA, it queries LVM for the associated physical partition. The file recovery module might then move the physical partition to another location.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for performing file recovery in a computer system being operatively coupled with a storage subsystem, wherein a data scrubbing process analyzes said storage subsystem for potential or existing storage errors, the method comprising the steps of:
   receiving a report from said data scrubbing process describing a storage error, wherein said report includes a logical block address (LBA) of a storage location where said storage error is located;
   responsive to receiving a report for said data scrubbing process describing a storage error, interacting with a file system created on logical unit numbers (LUN) provided by said storage subsystem in order to identify file information pertaining to a file containing the erroneous logical block address, wherein said file information is used at least in part by an application program when referencing said file, said file containing a plurality of logical block addresses including at least one logical block address in which no error was detected by said data scrubbing process;
   responsive to receiving a report for said data scrubbing process describing a storage error and interactive with a file system created on logical unit numbers (LUN) provided by said storage subsystem in order to identify file information pertaining to a file containing the erroneous logical block address, automatically moving the file pertaining to said erroneous logical block address to a new storage location by moving data at each logical block address contained in said file to a respective new logical block address different from the logical block address at which it was originally stored;
   updating pointers to said file managed by the file system; and
   in case of an error which is treated as unrecoverable by said data scrubbing process, accessing a backup copy of said file from a backup at a predetermined storage location.

2. The method according to claim 1, wherein said steps are performed without notifying said application about performing said steps.

3. The method according to claim 1, wherein if said data scrubbing process detects an error, the severity of said error is determined, and further actions are performed responsive to the degree of severity.

4. The method according to claim 3, wherein the degree of severity is either a) recoverable, b) critical or c) non-recoverable.

5. The method according to claim 1, wherein an integration with different I/O layers is implemented via a prior art, preferably a standardized interface, wherein said interface implements functionality to perform the steps of:
- querying a file name or a data set name based on logical block addresses (LBA), and
- instructing said I/O layer to move said file or said data set.

6. The method according to claim 5, further comprising the step of:
- moving said file or said data set and notifying said I/O layer about a new location, derived from said moving step.

7. The method according to claim 1, further comprising the steps of:
- if a predetermined degree of error severity is exceeded, then creating an additional copy of said file, said additional copy being in addition to a copy of said file stored at said new storage location, and
- updating the pointers to said file managed by the file system, respectively.

8. A computer program product for performing file recovery in a computer system being operatively coupled with a storage subsystem, wherein a data scrubbing process analyzes said storage subsystem for potential or existing storage errors, said product comprising a non-transitory computer useable medium including a computer readable program, wherein the computer readable program includes a functional file recovery component that when executed on a computer causes the computer to perform the steps of:
- receiving a report from said data scrubbing process describing a storage error, wherein said report includes a logical block address (LBA) of a storage location where said storage error is located;
- responsive to receiving a report for said data scrubbing process describing a storage error, interacting with a file system created on logical unit numbers (LUN) provided by said storage subsystem in order to identify file information pertaining to a file containing the erroneous logical block address, wherein said file information is used at least in part by an application program when referencing said file, said file containing a plurality of logical block addresses including at least one logical block address in which no error was detected by said data scrubbing process;
- responsive to receiving a report for said data scrubbing process describing a storage error and interactive with a file system created on logical unit numbers (LUN) provided by said storage subsystem in order to identify file information pertaining to a file containing the erroneous logical block address, automatically moving the file pertaining to said erroneous logical block address to a new storage location by moving data at each logical block address contained in said file to a respective new logical block address different from the logical block address at which it was originally stored;
- updating pointers to said file managed by the file system; and
- in case of an error which is treated as "unrecoverable" by said data scrubbing process, accessing a backup copy of said file from a backup at a predetermined storage location.

9. The computer program product according to claim 8, wherein the functional file recovery component further causes the computer to perform the steps of:
- if a predetermined degree of error severity is exceeded, then creating an additional copy of said file, said additional copy being in addition to a copy of said file stored at said new storage location, and
- updating the pointers to said file managed by the file system, respectively.

10. A digital data system, comprising:
- one or more applications executable on the digital data system and generating data organized in files;
- a file system for storing said files in at least one data storage device coupled to the digital data system;
- a file recovery module which receives notifications from a data scrubbing process, each notification describing a respective storage error and including a respective logical block address of a storage location within said at least one data storage device at which the respective storage error is located, and responsive to at least some said notifications: (a) identifies a file containing the logical block address at which the corresponding storage error is located, said file containing a plurality of logical block addresses including at least one logical block address in which no error was detected by said data scrubbing process; and (b) automatically moves the file containing the logical block address at which the corresponding storage error is located to a new storage location by moving data at each logical block address contained in the file to a respective new logical block address different from the logical block address at which it was originally stored.

* * * * *